United States Patent
Chung et al.

(10) Patent No.: US 10,990,195 B2
(45) Date of Patent: *Apr. 27, 2021

(54) ELECTRONIC APPARATUS HAVING OPTICAL NAVIGATION CIRCUIT

(71) Applicant: PixArt Imaging Inc., Hsin-Chu (TW)

(72) Inventors: Ching-Lin Chung, Hsin-Chu (TW); Kai-Ho Tsai, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/432,952

(22) Filed: Jun. 6, 2019

(65) Prior Publication Data

US 2019/0286249 A1 Sep. 19, 2019

Related U.S. Application Data

(63) Continuation of application No. 15/173,738, filed on Jun. 6, 2016, now Pat. No. 10,353,487.

(30) Foreign Application Priority Data

Dec. 14, 2015 (TW) .................................. 104141848

(51) Int. Cl.
| | |
|---|---|
| *G06F 3/03* | (2006.01) |
| *G04C 3/00* | (2006.01) |
| *G04G 21/00* | (2010.01) |
| *G06F 3/0362* | (2013.01) |
| *G06F 3/02* | (2006.01) |
| *G06F 3/0354* | (2013.01) |
| *G06F 1/16* | (2006.01) |
| *E05B 37/00* | (2006.01) |

(52) U.S. Cl.
CPC ............ *G06F 3/0304* (2013.01); *E05B 37/00* (2013.01); *G04C 3/005* (2013.01); *G04G 21/00* (2013.01); *G06F 1/163* (2013.01); *G06F 3/02* (2013.01); *G06F 3/0312* (2013.01); *G06F 3/0362* (2013.01); *G06F 3/03543* (2013.01)

(58) Field of Classification Search
CPC ...... G06F 3/0304; G06F 3/0362; G04G 21/00
See application file for complete search history.

(56) References Cited

U.S. PATENT DOCUMENTS

| | | | | |
|---|---|---|---|---|
| 4,455,552 A | * | 6/1984 | Greiner ................. | E05B 45/061 340/543 |
| 5,579,032 A | * | 11/1996 | Busch ................... | G06F 3/0362 345/157 |

(Continued)

FOREIGN PATENT DOCUMENTS

| | | | | | |
|---|---|---|---|---|---|
| JP | | 55052012 A | * | 4/1980 | ........... G02B 6/3604 |

*Primary Examiner* — Nitin Patel
*Assistant Examiner* — Robert M Stone
(74) *Attorney, Agent, or Firm* — Winston Hsu (57) ABSTRACT

An electronic apparatus includes a structure and an optical navigation circuit. A first end of the structure is located inside the electronic apparatus and its second end corresponds to a user's control. The structure can be moved forward/backward in a specific direction and/or rotated in another direction. The optical navigation circuit captures reflection of a light emitting to the structure to detect displacement of the image along a specific axis of the structure, and determines the user's operating behavior as a specific operation according to a change of the sensed displacement of the image.

14 Claims, 9 Drawing Sheets

(56) References Cited

U.S. PATENT DOCUMENTS

| | | | | |
|---|---|---|---|---|
| 5,936,613 | A * | 8/1999 | Jaeger | G06F 3/0238 345/172 |
| 6,300,938 | B1 * | 10/2001 | Culver | G06F 3/0362 345/156 |
| 8,822,903 | B2 * | 9/2014 | Phan Le | G01S 7/4811 250/208.4 |
| 9,971,305 | B2 * | 5/2018 | Ely | G06F 3/0488 |
| 10,018,966 | B2 * | 7/2018 | Ely | G04B 3/041 |
| 10,019,097 | B2 * | 7/2018 | Ely | G01D 5/2412 |
| 10,037,006 | B2 * | 7/2018 | Ely | G05G 1/025 |
| 10,061,399 | B2 * | 8/2018 | Bushnell | G04G 21/08 |
| 10,145,711 | B2 * | 12/2018 | Boonsom | G01D 5/34715 |
| 10,175,652 | B2 * | 1/2019 | Ely | G04G 21/08 |
| 10,190,891 | B1 * | 1/2019 | Rothkopf | G01D 5/3473 |
| 10,234,828 | B2 * | 3/2019 | Ely | G04B 3/04 |
| 10,551,798 | B1 * | 2/2020 | Bushnell | G04C 3/008 |
| 10,664,074 | B2 * | 5/2020 | Moussette | G06F 1/163 |
| 2003/0174590 | A1 * | 9/2003 | Arikawa | G04B 37/106 368/319 |
| 2003/0184520 | A1 * | 10/2003 | Wei | G06F 3/03543 345/163 |
| 2005/0002277 | A1 * | 1/2005 | Fukuda | G01D 5/2412 368/80 |
| 2005/0164623 | A1 * | 7/2005 | Huynh | H03K 17/941 454/69 |
| 2006/0012584 | A1 * | 1/2006 | Vassallo | G06F 3/016 345/184 |
| 2007/0242277 | A1 * | 10/2007 | Dolfi | G06F 3/0317 356/498 |
| 2008/0030458 | A1 * | 2/2008 | Helbing | G06F 3/0317 345/156 |
| 2008/0061220 | A1 * | 3/2008 | Machida | G06F 3/0317 250/221 |
| 2010/0020336 | A1 * | 1/2010 | Hosobuchi | G04C 3/14 356/614 |
| 2011/0067465 | A1 * | 3/2011 | Luo | E05B 47/063 70/278.7 |
| 2011/0240836 | A1 * | 10/2011 | Phan Le | G01D 5/285 250/231.11 |
| 2012/0092970 | A1 * | 4/2012 | Saleh | G04B 27/002 368/308 |
| 2015/0041289 | A1 * | 2/2015 | Ely | H01H 3/122 200/4 |
| 2015/0077252 | A1 * | 3/2015 | King | G08B 13/06 340/542 |
| 2016/0131508 | A1 * | 5/2016 | Nagata | G01D 5/24461 250/231.14 |
| 2016/0327911 | A1 * | 11/2016 | Eim | G04B 27/002 |
| 2017/0011873 | A1 * | 1/2017 | Ely | H01H 9/16 |
| 2017/0075305 | A1 * | 3/2017 | Ryu | G06F 3/048 |
| 2017/0089735 | A1 * | 3/2017 | Ruh | G01D 5/30 |
| 2017/0104902 | A1 * | 4/2017 | Kim | H04N 5/2254 |
| 2017/0139489 | A1 * | 5/2017 | Chen | G06T 7/0002 |
| 2017/0255266 | A1 * | 9/2017 | Holenarsipur | G06F 1/163 |
| 2020/0089331 | A1 * | 3/2020 | Yang | H04N 5/2353 |

* cited by examiner

ELECTRONIC APPARATUS HAVING OPTICAL NAVIGATION CIRCUIT

CROSS REFERENCE TO RELATED APPLICATIONS

This application is a continuation application of the U.S. Non-Provisional application Ser. No. 15/173,738 filed on Jun. 6, 2016. The entire contents of the related application are included herein by reference.

BACKGROUND OF THE INVENTION

1. Field of the Invention

The present invention relates to an optical navigation sensing mechanism, and more particularly to an electronic apparatus using optical navigation technology to sense displacement of a surface image of a movable structure for determining user's operating behavior.

2. Description of the Prior Art

Generally speaking, as for a user who is operating an electronic product (e.g., a user is pressing a button of an electronic product), because nowadays a metal dome is generally implemented in a button of a typical electronic product (particularly, a hand-held device), the principle that a contact point switch of a metal dome is switched on when a button is pressed and the contact point switch of the metal dome is not switched on when the button is pressed is used for determining whether a user presses a button. However, a metal dome has a service life issue. After a metal dome has been used for a period of time, it is easily found that even though a button has been actually pressed, the contact point switch of the metal dome in the button still stays in a non-conducting state, thus making a corresponding function not be activated. The main reason of this situation is the oxidation of the contact point switch of the metal dome. With the increase of use time, the oxidation issue of the contact point switch will be more serious, and the probability of button function failure will be higher. Furthermore, as for a user who is operating a watch crown of a typical watch device, the watch crown of the typical watch device employs a mechanical means controlled by gear wheels, and gear wheels may be damaged under a long-term use to cause a low precision issue for user's control. Therefore, it is important to develop an identification mechanism which can identify user's operating behavior when the user is operating a button of an electronic device or a watch crown of a watch device, and can still offer high precision after a long-term use.

SUMMARY OF THE INVENTION

Therefore, one of the objectives of the present invention is to provide an electronic apparatus which uses the optical navigation technology to sense a displacement of a surface image of a movable structure for determining user's operating behavior.

According to an embodiment of the present invention, an electronic apparatus is disclosed. The electronic apparatus includes a structure and an optical navigation circuit. A first end of the structure is located inside the electronic apparatus, and a second end of the structure corresponds to a control of a user. The structure can be moved forward/backward in a specific direction or rotated in another specific direction. The optical navigation circuit is configured to capture reflection of a light emitting to the structure to detect at least one displacement of the surface image in a direction of at least one specific axis of the structure, and determine an operation of the user as performing specific behavior according to a change of the detected at least one displacement.

The electronic apparatus is an optical mouse device, and the structure is configured to realize at least one of a button function and a function of locking/unlocking a host screen. With regard to realizing the button function, since it is unlike the prior art design that is based on whether a contact point switch of a metal dome is electrically conductive to determine whether a user presses the external button, it can avoid the loose contact issue caused by oxidation of the contact point after a long-term use. Compared to the prior art design, the proposed implementation using the optical sensing technology can offer higher precision under a long-term use.

In addition, the electronic apparatus may be a rotary combination lock device, and the structure is configured to realize a password rotary disc of the rotary combination lock device. The optical sensing technology is used for realizing an electronic locking/unlocking function.

In addition, the electronic apparatus may be a wearable device. A second end of the structure is configured to realize at least one of a button and a rotary disc for a user to operate the wearable device. The optical sensing technology is used for realizing a button function and/or a rotary disc function of a wearable device, or realizing a watch crown function of a smart watch. The optical sensing technology can offer higher precision, and avoid a mechanical gear wear issue after a long-term use.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
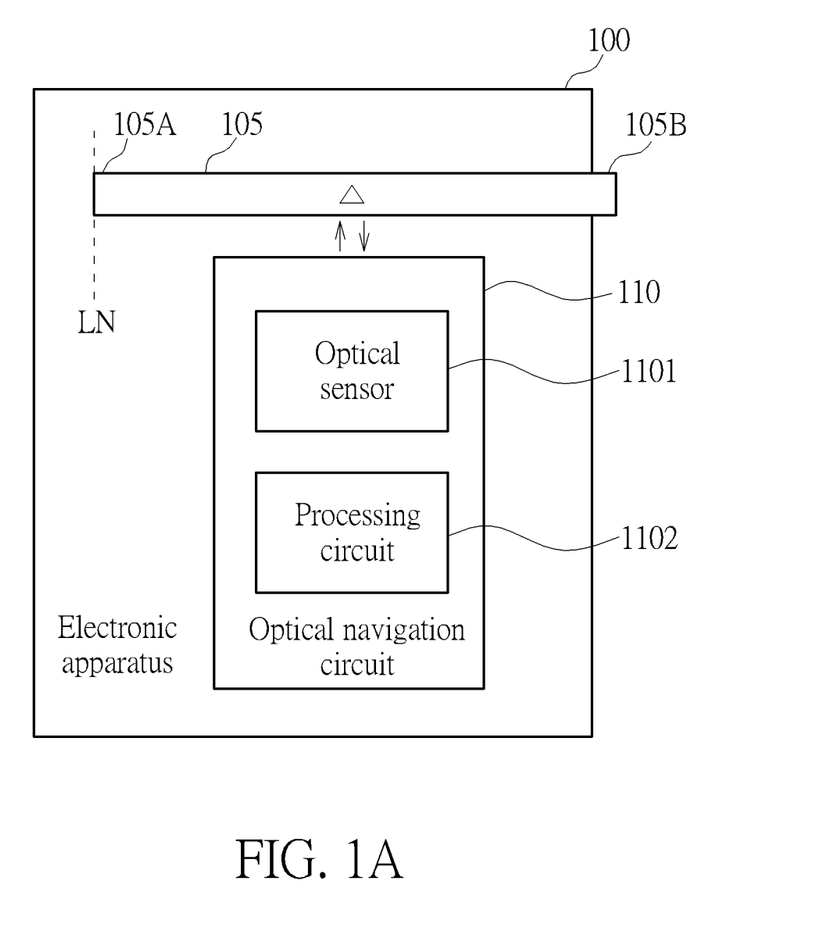
FIG. 1A is a diagram illustrating an electronic apparatus according to an embodiment of the present invention.

Please refer to FIG. 1A, which is a diagram illustrating an electronic apparatus 100 according to an embodiment of the present invention. The electronic apparatus 100 includes a structure 105 and an optical navigation circuit 110. The structure 105 can be move forward/backward in a specific direction and/or can be rotated clockwise/counterclockwise in another specific direction. A first end 105A of the structure 105 is located inside the electronic apparatus 100. A second end 105B of the structure 105 corresponds to a user's control, and can be located outside the electronic apparatus 100 (as shown in FIG. 1A) or can be located inside the electronic apparatus 100. For example, when being located inside the electronic apparatus 100, the second end 105B can be indirectly connected to a user interface (not shown in FIG. 1A) which can be used by a user to indirectly control the state of the structure 105. Alternatively, when being located outside the structure 100, the second end 105B of the structure 105 may be directly controlled by a user. In addition, the surface of the structure 105 can be designed with a specific texture pattern or marked with a specific color symbol, so as to enable the optical navigation circuit 110 to more clearly locate a surface image and precisely measure the displacement of the surface image. However, this is not intended to be a limitation of the present invention. Even though the surface of the structure 105 in another embodiment has no specific texture pattern or specific color symbol, the optical navigation circuit 110 can also precisely detect displacement of a surface image of the structure 105 by capturing a reflected light from normal surface texture of the structure 105. The triangular mark A in FIG. 1A represents a normal surface texture, a specific texture pattern, or a marked specific color symbol of the structure 105. In addition, the shape of the structure 105, in practice, may be an elongated structure, a column object, a needle object, and/or a rod object; however, the outward appearance characteristics, including shape, length, width, etc. of the structure 105, are not intended to be limitations of the present invention. It is also possible to realize the function of the structure 105 by using a circular structure, a square structure, etc.

Figure 1B:
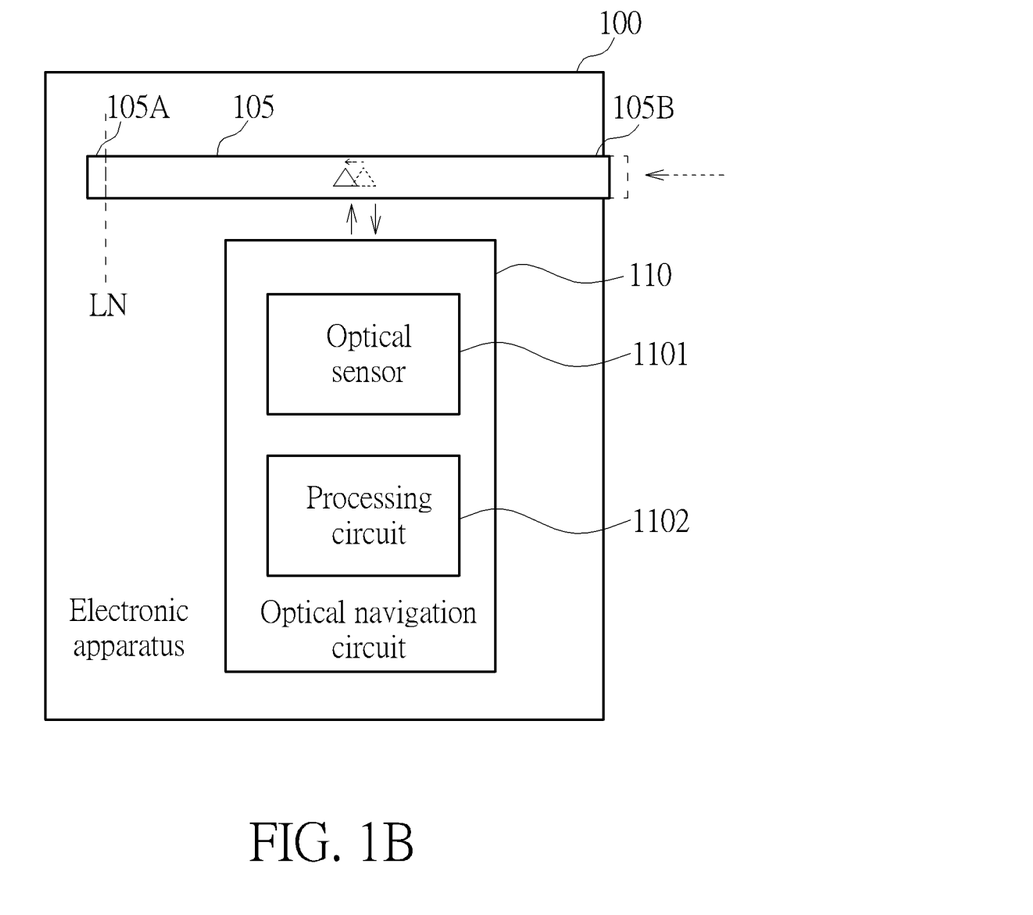
FIG. 1B through FIG. 1E are diagrams respectively illustrating a change result of state/space location of the structure caused by user's different controls.
Figure 1C:
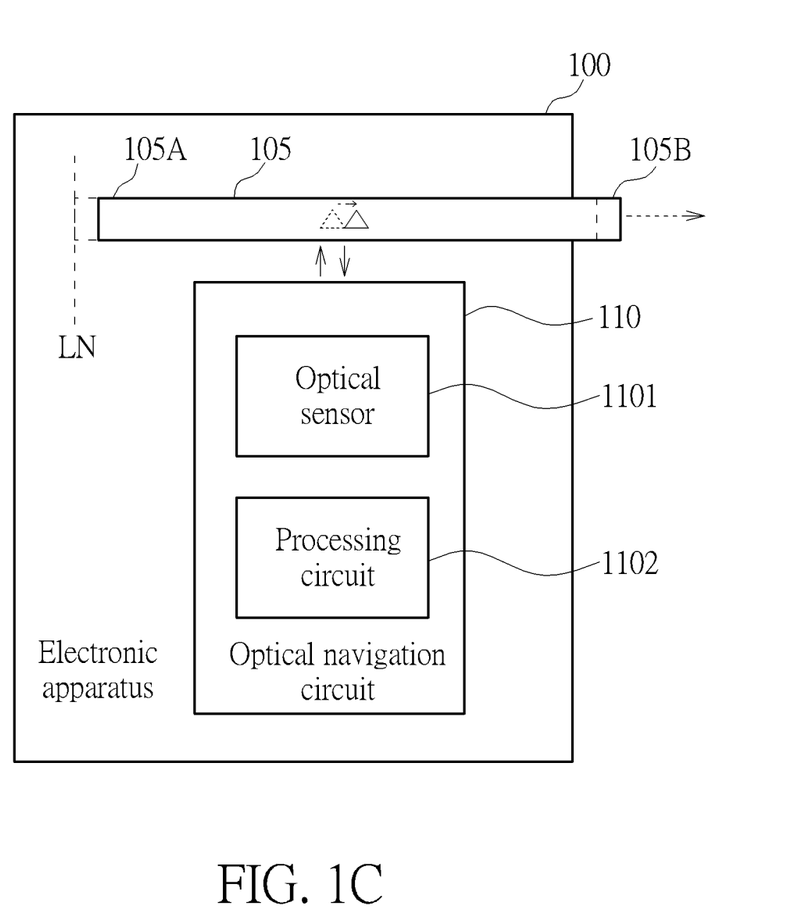
Figure 1D:
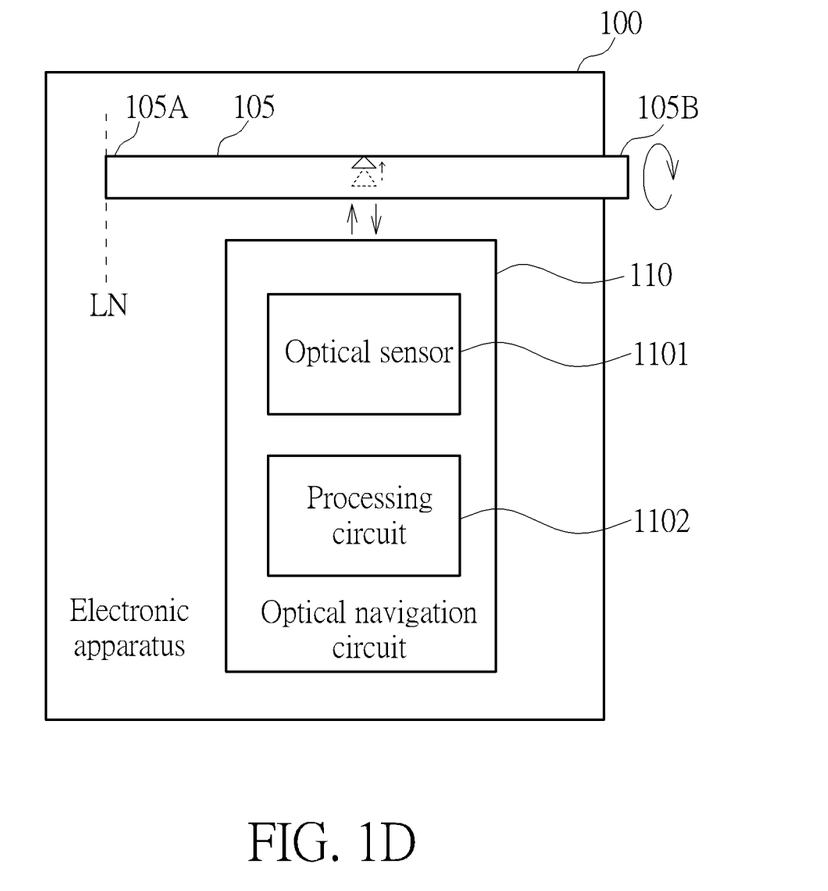
Figure 1E:
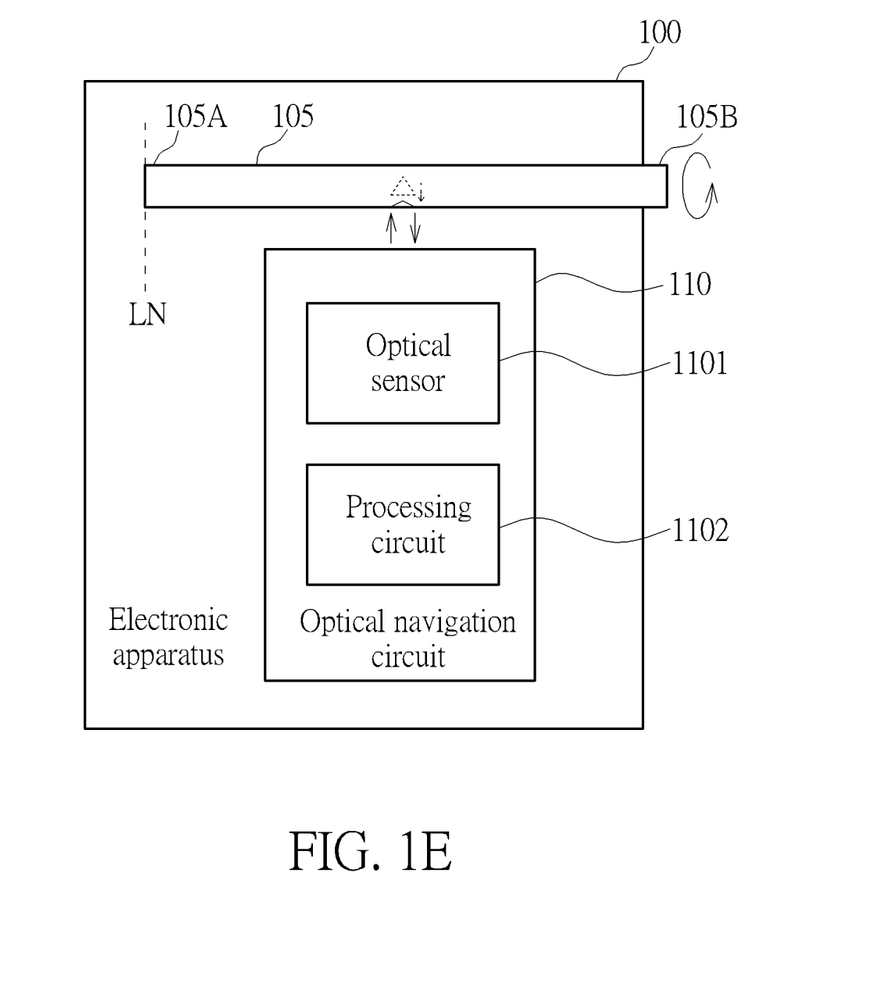

To effectively illustrate a change of a state/spatial location of the structure 105 that results from a user's control, a dotted line LN is drawn in FIG. 1A to represent the spatial location of the structure 105 in the electronic apparatus 100 when a user is not controlling the structure 105. The dotted line LN can be regarded as a reference baseline for illustrative purposes only; however, it should be noted that, in practice, the dotted line is not required. Please refer to FIG. 1B through FIG. 1E, which are diagrams illustrating different change results of the state/spatial location of the structure 105 caused by user's different controls, respectively. As shown in FIG. 1B, a user can make the structure 105 move toward the interior of the electronic apparatus 100 by directly or indirectly pushing the second end 105B of the structure 105. Hence, the first end 105A will pass the dotted line LN, and the location of the triangular mark A that is representative of the surface texture will also change to have displacement. In addition, as shown in FIG. 1C, a user can make the structure 105 move toward the exterior of the electronic apparatus 100 by directly or indirectly pulling the second end 105B of the structure 105. Hence, the first end 105A will leave the dotted line LN, and the location of the triangular mark A that is representative of the surface texture will also change to have displacement. In addition, as shown in FIG. 1D and FIG. 1E, a user can make the structure 105 itself rotate clockwise/counterclockwise by directly or indirectly rotating the second end 105B of the structure 105 clockwise/counterclockwise. Hence, the location of the triangular mark A that is representative of the surface texture will have different location changes and different displacement due to the clockwise/counterclockwise rotation.

Therefore, as mentioned above, a user can make the surface texture (e.g., a certain dot or a certain area) of the structure 105 have displacement in one direction or in multiple directions by pushing forward, pulling backward, twisting left/right (i.e., rotating clockwise/counterclockwise), and/or other control ways (e.g., button pressing). For example, in response to user's different controls, the triangular mark A that is representative of the surface texture has different displacement amounts and different displacement directions. The optical navigation circuit 110 is located at a position nearby the structure 105 without being connected to the structure 105 (however, this is not meant to be a limitation of the present invention), and the optical navigation circuit 110 is configured to emit light upon the surface of the structure 105, capture reflection of the emitted light, sense/receive a surface image (i.e., the triangular mark A representative of the surface texture) of the structure 105, and detect/determine at least one displacement of the surface image in a direction of at least one specific axis of the structure 105 according to the surface image. The optical navigation circuit 110 can continuously sense the reflection image resulting from the light emitted upon the structure 105 under a fixed angle or a fixed location of the optical navigation circuit 110. The optical navigation circuit 110 can detect the displacement amount and displacement direction of the surface image A, and can also detect a change of the displacement direction of the surface image A. Next, the optical navigation circuit 110 determines the user's operation as performing the specific operating behavior (i.e., judges what kind of operating behavior the user is performing) according to a change of the detected at least one displacement. In practice, the optical navigation circuit 110 can include an optical sensor 1101 and a processing circuit 1102. The optical sensor 1101 is used for detecting the above-mentioned surface image A, and the processing circuit 1102 is used for calculating the displacement amount and the displacement direction of the surface image A and determining the operating behavior performed by a user. In addition, in another embodiment where the electronic apparatus 100 is connected to a processor of a host, the processing circuit 1102 can output the displacement amount and the displacement direction of the surface image A to the processor of the host, so as to use the computation resource of the processor of the host to determine the operating behavior performed by a user. The effect of determining user's operating behavior according to displacement of the surface image A is equivalently achieved.

Therefore, through using the optical navigation circuit 110 to capture reflected light from the surface of the structure 105, the optical navigation circuit 110 can capture and sense the surface image A when the structure 105 moves forward/backward or rotates clockwise/counterclockwise, and can detect at least one displacement (which includes an displacement amount and a displacement direction) of the surface image A in a direction of at least one specific axis of the structure 105. Next, the optical navigation circuit 110 determines that the user's current operation makes the structure 105 be pushed forward, be pulled backward, be rotated, or have a combination of actions mentioned above, and accordingly determines what kind of operating/controlling behavior the user is performing. As for the above-mentioned example, the electronic apparatus 100 uses the operations of the structure 105 and the optical navigation circuit 110 to detect and determine that a user is currently performing a button pressing control, or the electronic apparatus 100 uses the operations of the structure 105 and the optical navigation circuit 110 to determine that a user is currently performing a rotating control, and determine the clockwise/counterclockwise rotation angle, an order of different rotation angles, etc. Therefore, architecture and operation of the electronic apparatus 100 shown in FIG. 1 can be applied to different technology fields, such as an electronic apparatus with a button function for realizing a button pressing function or an electronic apparatus with a watch function for realizing a watch crown function. It should be noted that, the spirit of the present invention lies in sensing displacement (which includes a displacement amount and a displacement direction) of the surface image A of the structure 105 in at least one direction by using the optical navigation circuit 110 to determine the operating/controlling behavior of a user operating the electronic apparatus 100, and it is not limited to any specific application field. In addition, it should be noted that the processing circuit 1102 of the present invention can be realized by a pure hardware circuit, a software program code, or a combination of hardware and software.

For better understanding of the spirit and application of the present invention, the following discusses various embodiments that apply the concept of the electronic apparatus 100 to different fields; however, it should be noted that embodiments mentioned hereinafter are only for illustrative purposes, not limitations of the present invention.

In a first embodiment, the concept of the electronic apparatus 100 can be applied to an electronic apparatus with a button function. Please refer to FIG. 2A, which is a diagram illustrating an electronic apparatus 200 with an external button according to the first embodiment of the present invention. The electronic apparatus 200, for example, is a smart phone device, and the external button, for example, is the physical button under the display panel of the smart phone device. In other embodiments, the electronic apparatus 200 can also be a mouse device with external buttons. The electronic apparatus 200 includes a structure 105, an optical navigation circuit 110, a flexible structure 115, and an external button 120. If the concept of the electronic apparatus 100 is applied to an optical mouse device, the mechanism of the optical navigation circuit 110 can be combined with the optical sensor originally installed in the optical mouse device, or can be implemented using an extra optical sensor. In practice, the flexible structure 115 can be used as a buffer when a user presses the external button 120, and the buffer can be realized by a dome which can be a metal dome with electrical conducting capability, or can be realized by a common dome without electrical conducting capability. However, this is not intended to be a limitation of the present invention. The flexible structure 115 can also be realized by other flexible materials, such as a spring, a flexible button, etc. In other words, any one of a dome, a metal dome, a spring, and a flexible button can be used for realizing the flexible structure 115 of the present invention. In addition, the dome 115 can be used as a basis of confirming whether a user presses the external button 120. When a user presses the external button 120 to make the structure 105 move forward, the structure 105 will push/press the dome 115 to make the dome 115 have deformation that enables the contact point switch of the dome 115 to be electrically conductive. Hence, it can be determined that the user currently presses the external button 120. However, if a user releases/frees the external button 120 at the time of still pressing the external button 120 to make the structure 105 move backward, the structure 105 releases the dome 115 to make the dome 115 recover to its original shape, such that the contact point switch of the dome 115 is no longer electrically conductive. Hence, it can be determined that the user currently releases the external button 120.

With regard to the realized structure, the first end 105A of the structure 105 is located inside the electronic apparatus 100 and connected to the dome 115, and the second end 105B of the structure 105 corresponds to a user's control.

Figure 2A:
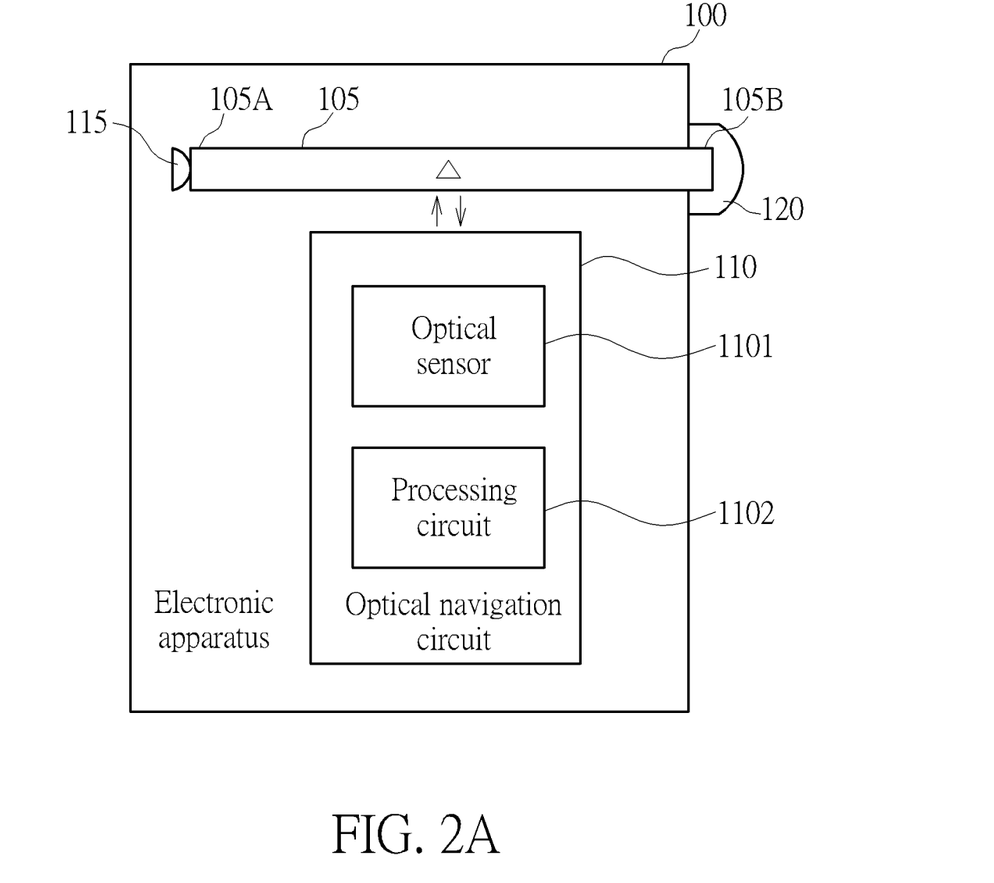
FIG. 2A is a diagram illustrating an electronic apparatus with an external button according to the first embodiment of the present invention.
Figure 2B:
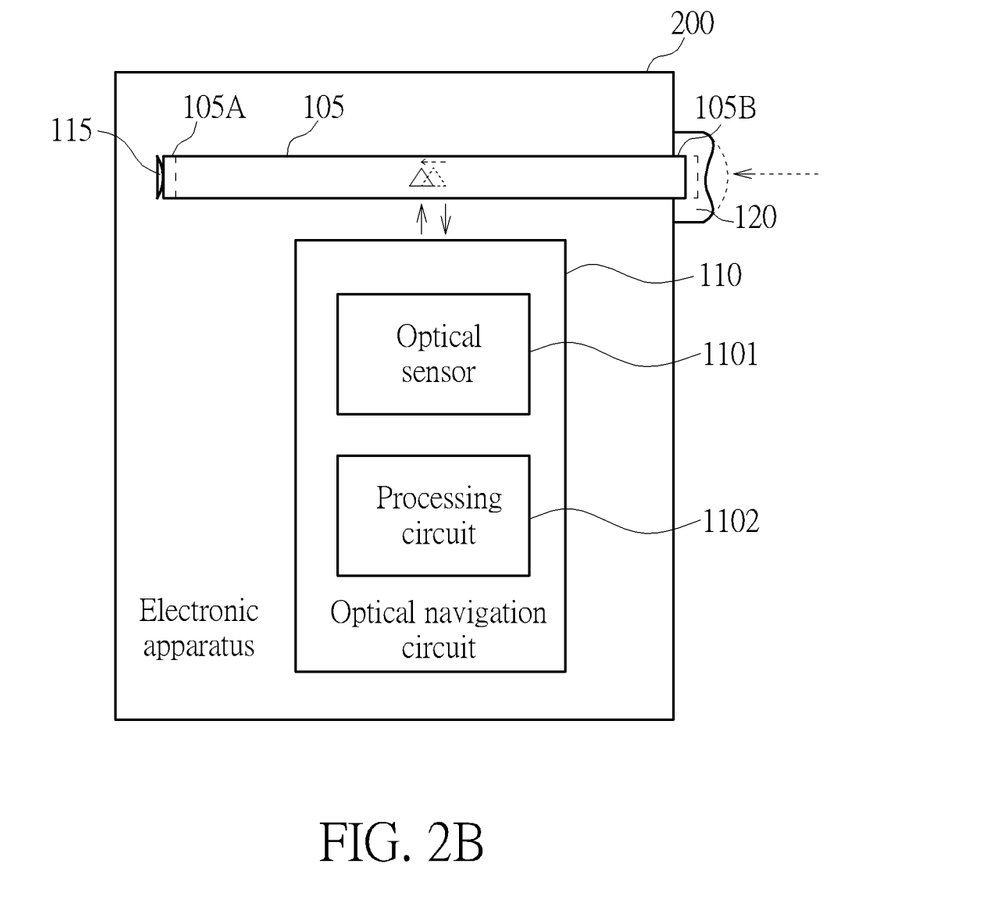
FIG. 2B is a diagram illustrating the external button of the electronic apparatus pressed by a user according to the embodiment of FIG. 2A.

For example, the second end 105B is connected to the external button 120, and a user can indirectly control the state and/or spatial location of the structure 105 by pressing/releasing the external button 120. FIG. 2B is a diagram illustrating the external button 120 pressed by a user according to the embodiment of FIG. 2A. When a user presses the external button 120, a state of the structure 105 generates displacement. At this moment, the dome 115 is used as a buffer to thereby deform (the dome 115 will be simultaneously electrically conductive if the dome 115 has a contact point switch). Like the traditional mechanism, the electronic apparatus 200 can detect whether a user presses the external button 120 by determining the electrical conduction state of the contact point switch. In addition, in order to avoid a loose contact situation of a contact point switch under a long-term use, the electronic apparatus 200 preferably detects whether a user presses the external button 120 by using the optical navigation circuit 110 to detect displacement of the surface image A on the structure 105. When displacement of the sensed surface image A is detected as moving along the central axis of the structure 105 itself and moving toward the dome 115 and the amount of the displacement is larger than a specific threshold value (which is used for avoiding misjudgment), the optical navigation circuit 110 can determine the user's operation as pressing the external button 120. However, considering a case where the operating state changes from the state of FIG. 2B to the state of FIG. 2A, when displacement of the sensed surface image A is detected as moving along the central axis of the structure 105 and moving toward the external button 120 and the amount of the displacement is larger than the specific threshold value, the optical navigation circuit 110 can determine the user's operation as releasing the external button 120. Therefore, the aforementioned operation of using the optical navigation circuit 110 to sense displacement of the surface image A of the structure 105 to detect whether a user presses the external button 120 may not need to refer to whether a contact point switch of the dome 115 is switched on. Therefore, even though the dome 115 has a loose contact situation caused by oxidation of the contact point after a long-term use, the loose contact situation will not influence the precision of operation required for the present invention to determine whether a user presses the external button 120.

In addition, the electronic apparatus 200 can continuously detect displacement of the surface image A on the structure 105 by using the optical navigation circuit 110 to generate multiple displacement detections of the surface image A at successive different time points, and determine whether a user presses the external button 120 by determining changes of directions of the multiple displacement detections generated sequentially. For example, concerning two successive displacement detections of the surface image A, the optical navigation circuit 110 can sense displacement of the surface image A to thereby detect first displacement and second displacement of the structure 105 along the central axis. Next, the optical navigation circuit 110 detects whether a user presses or releases the dome 115 via the second end 105B of the structure (i.e., the optical navigation circuit 110 can determine whether a user's operation results in deformation of the dome 115) according to whether the first displacement and the second displacement sequentially satisfy a specific displacement condition. If the first displacement corresponds to forward movement of the structure 115 (i.e., movement toward the interior of the electronic apparatus 200) and the second displacement corresponds to backward movement of the structure 105 (i.e., movement in an opposite direction), that is to say, the first displacement and the second displacement sequentially correspond to two displacement amounts in opposite directions along the central axis, and the order of the displacement shows that the structure 105 is determined as moving forward first and then moving backward so as to make the dome 115 be pressed first and then be released, the optical navigation circuit 110 can determine that the user presses the external button 120 and then immediately releases the external button 120. Hence, it can be determined that the user has pressed the external button 120 once. However, if the first displacement and the second displacement sequentially correspond to two displacement amounts in the same direction along the central axis and the direction is facing toward the dome 115, the optical navigation circuit 110 can determine that the user keeps on pressing the external button 120.

In addition, in order to avoid misjudgment, when each of displacement amounts of the above-mentioned first displacement and second displacement is smaller than a specific displacement amount, although the optical navigation circuit 110 detected the first displacement and the second displacement of the surface image A, it can selectively decide not to refer to the first displacement and the second displacement to determine that the user presses or releases the external button 120 (i.e., at the moment, it can selectively decide not to refer to the first displacement and the second displacement to determine whether the user's operation makes the dome 115 be pressed first and then be released). In addition, most of the user's operations do not have the behavior of pressing the button several times during an extremely short period of time. Therefore, in order to avoid misjudgment, when each of the amounts of the above-mentioned first and second displacement is detected as being larger than the specific displacement amount for the first time (i.e., when it is detected that a user presses the external button 120 for the first time in a recent period of time), even though multiple displacement amounts are detected during a subsequent extremely short time interval, the optical navigation circuit 110 can also selectively temporarily stop referring to the displacement of the surface image A on the structure 105 to determine a user's operation. Therefore, even though the flexible structure 115 of the present invention is realized by a flexible material (e.g., a spring), the misjudgment resulting from multiple rebounds of the flexible material itself can be avoided.

Figure 3:
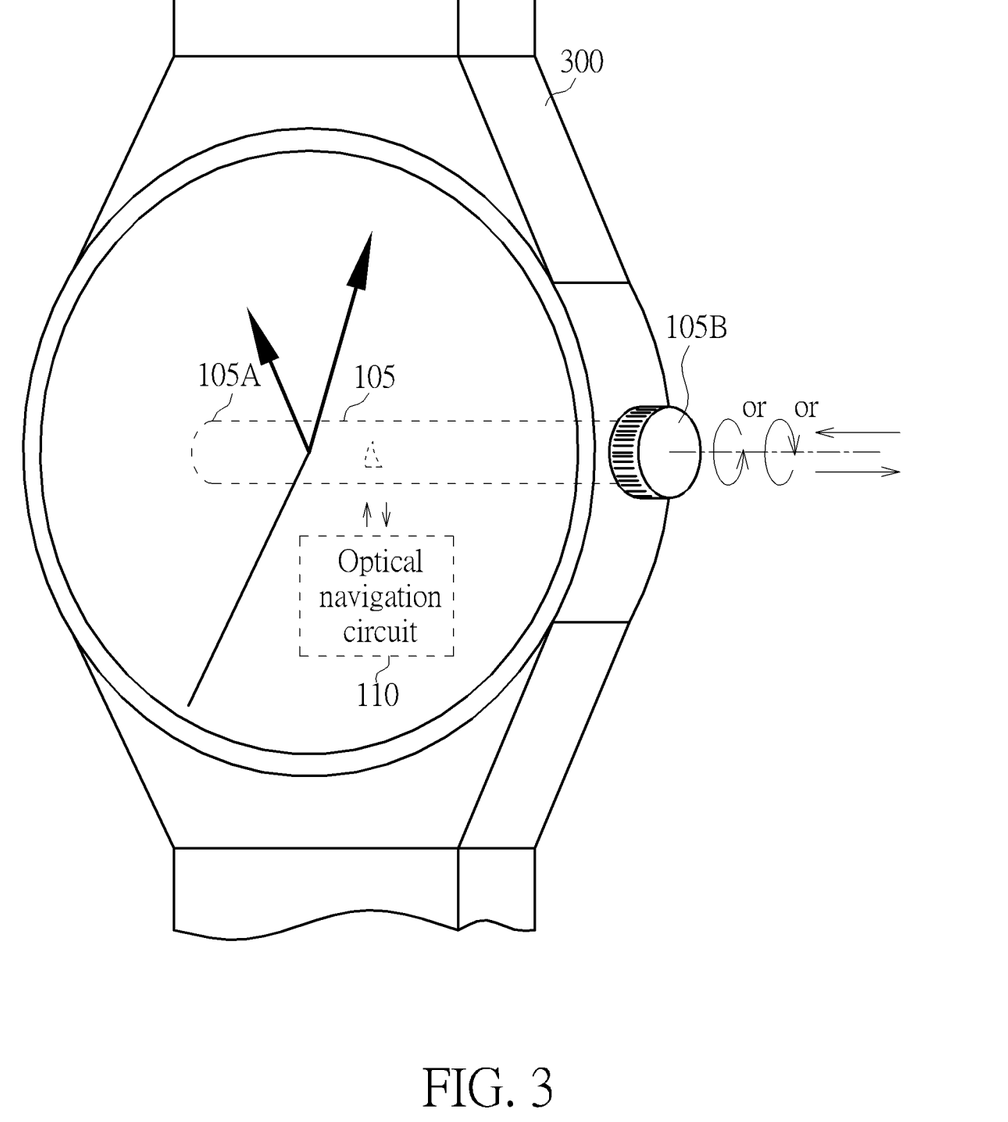
FIG. 3 is a diagram illustrating an embodiment of applying the concept of the electronic apparatus shown in FIG. 1A to a smart watch device.

Moreover, in another embodiment, the concept of the electronic apparatus 100 can be applied to an electronic device with a watch crown function (e.g., a wearable device with a rod-shaped control end, a smart watch device, or a smart wristband with a rod-shaped control end). Please refer to FIG. 3, which is a diagram illustrating an embodiment of applying the concept of the electronic apparatus 100 shown in FIG. 1A to a smart watch device. The electronic apparatus 300 is a smart watch device whose interior includes the above-mentioned structure 105 and optical navigation circuit 110 (represented with a dotted-line block). The second end 105B of the structure 105 is used as a graduated rotary disc of a watch crown, and texture can be depicted on the second end 105B to be convenient for a user to control. The user can rotate the structure 105 along the central axis of the structure 105 via the graduated rotary disc. As shown in FIG. 3, the user can rotate the watch crown (the second end 105B) clockwise, rotate the watch crown (the second end 105B) counterclockwise, push the watch crown (the second end 105B) forward, and/or pull the watch crown (the second end 105B) backward to perform different controls. The different control behavior causes changes of state or spatial location of the structure 105, and the location of the triangular mark A that represents the surface texture/image also changes to have displacement in at least one direction. Through emitting light to the surface of the structure 105, the optical navigation circuit 110 can capture reflection of the light, sense/receive the surface image A of the structure 105, detect or determine at least one displacement of the surface image A in a direction of at least one specific axis (e.g., central axis and/or transverse axis) of the structure 105. The optical navigation circuit 110 can continuously sense reflection image (which results from the light emitted to the structure 105) at a fixed angle or a fixed location of the optical navigation circuit 110, detect an displacement amount and a displacement direction of the surface image A, and also detect a change of a displacement direction of the surface image A. As for a transverse axis of the structure 105, the optical navigation circuit 110 can detect and determine a rotation amount and a rotation direction of the structure 105 after the structure 105 is rotated. Next, the optical navigation circuit 110 determines which specific operating behavior that the user has according to a change of the detected at least one displacement, and determines a movement change or an angle change caused by the user's specific operating behavior, such as a corresponding angle and direction of the structure 105 rotated by the user. Therefore, through realizing the structure 105 and the optical navigation circuit 110 in the electronic apparatus 300 of a smart watch, it is effective to employ the optical navigation sensing technique to detect and determine user's operating behavior for a smart watch, such as determining that the user is currently adjusting the watch time, the user is currently controlling a display range of a web page (if the smart watch is currently running a web browser application), the user is currently zooming a map (if the smart watch is currently running a map application), and/or the user is currently controlling a display range of an email content (if the smart watch is currently running an email application). It should be noted that, the different applications mentioned above are only for illustrating the notable benefits of applying the present invention to a wearable electronic apparatus with a rod-shaped control end, and they are not intended to be limitations of the present invention. In addition, the operations of the structure 105 and the optical navigation circuit 110 can realize a button function of a wearable electronic device, or can realize a button function and a rotary disc (e.g., a watch crown of a smart watch) function of a wearable electronic device simultaneously.

Moreover, in yet another embodiment, the operations of the structure 105 and the optical navigation circuit 110 can be applied to realizing a combination lock function, such as being applied to a mouse device and/or a combination lock device. Please refer to FIGS. 1A, 1D and 1E again. Taking a mouse device as an example, the second end 105B of the structure 105 is depicted with different graduations having different angles. When a user uses a mouse device to lock or unlock a screen of a host screen, the user can, for example, rotate clockwise by 30 graduations first and then rotate counterclockwise by 50 graduations to lock or unlock the screen. In response to the user's operation, the structure 105 also rotates clockwise first and then rotates counterclockwise. Therefore, the location of the surface image A has displacement with different directions and different displacement amounts. The optical navigation circuit 110 calculates the changed displacement amount and displacement direction by sensing the location of the surface image A, thereby determining the user's operation as rotating the structure 105 clockwise by 30 graduations first and then rotating the structure 105 counterclockwise by 50 graduations. Hence, it is determined that the user currently attempts to use a mouse device to lock or unlock the screen of the host. As mentioned above, the operation of the structure 105 and the optical navigation circuit 110 can realize a button function of a mouse device or a function of locking/unlocking a screen of a host. That is, at least one of the functions can be realized.

Furthermore, taking a combination lock as an example, the second end 105B of the structure 105 in FIG. 1A can be connected to a password rotary disc controlled and operated by a user. Similarly, the user can rotate the password rotary disc clockwise by A graduations first and then rotate the password rotary disc counterclockwise by B graduations, so as to perform locking or unlocking. In response to the user's operation, the structure 105 also rotates clockwise first and then rotates counterclockwise. Therefore, the location of the surface image A will have displacement with different directions and different displacement amounts. The optical navigation circuit 110 calculates the changed displacement amount and displacement direction by sensing the location of the surface image A, thereby determining the user's operation as rotating the structure 105 clockwise by A graduations first and then rotating the structure 105 counterclockwise by B graduations. Hence, it is determined that the user currently attempts to perform locking or unlocking. A combination lock device can be applied to an anti-theft door lock, a rotary combination lock of a safe, etc. It should be noted that, the embodiments mentioned in the above paragraphs are only for illustrating that the operation of the structure 105 and the optical navigation circuit 110 of the present invention can be applied to different implementations, and they are not intended to be limitations of the present invention.

Figure 4:
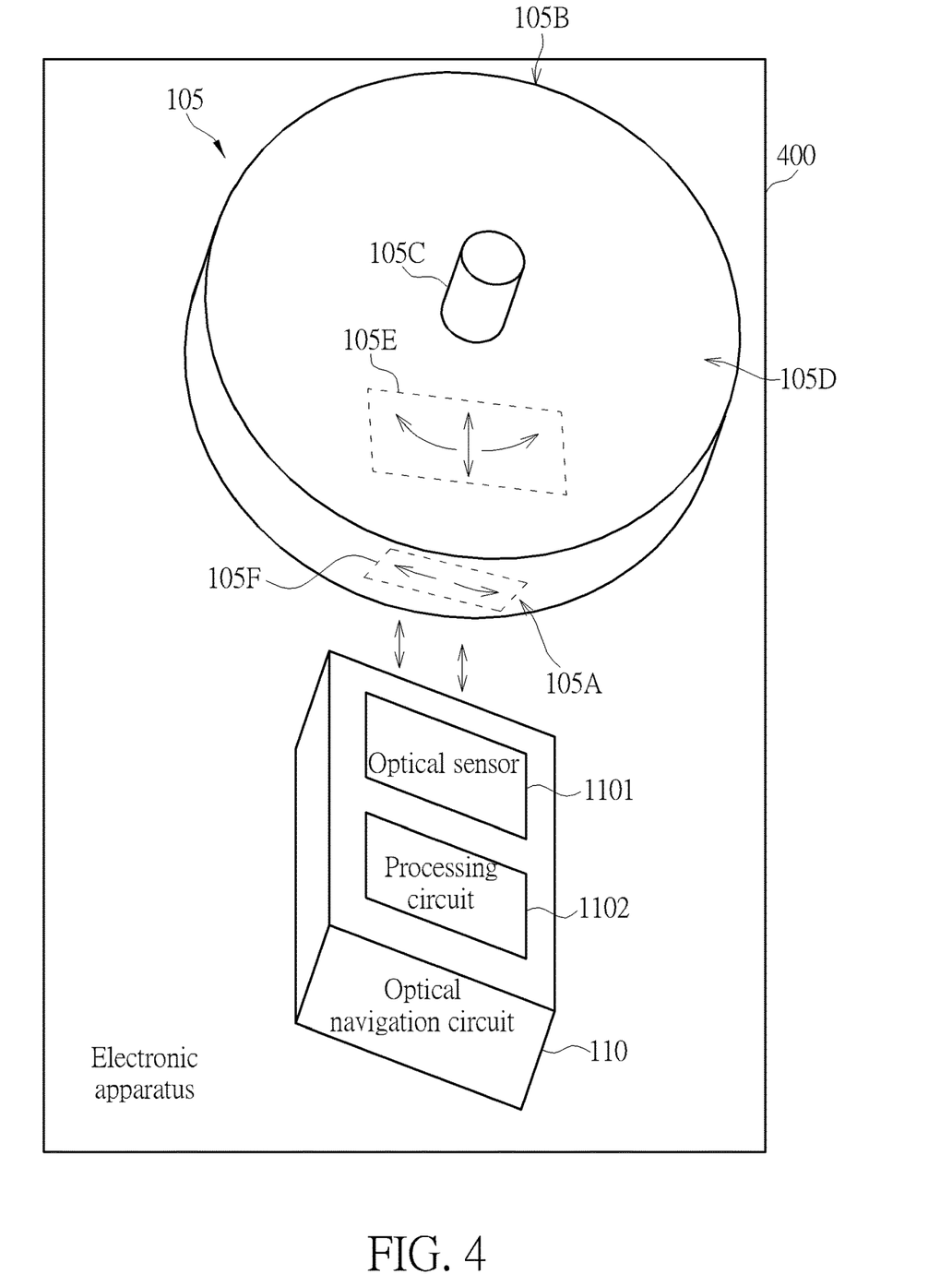
FIG. 4 is a diagram illustrating the concept of realizing the structure by a roller element according to an embodiment of the present invention.

Moreover, in still yet another embodiment, the above-mentioned structure can be realized by using a roller element. Please refer to FIG. 4, which is a diagram illustrating the concept of realizing the structure 105 by a roller element according to an embodiment of the present invention. As shown in FIG. 4, the electronic apparatus 400 includes a structure 105 that is realized by a roller element, and further includes the above-mentioned optical navigation circuit 110. The roller element 105 includes a wheel shaft 105C and a runner hub 105D. The wheel shaft 105C passes through the runner hub 105D. The roller element 105 corresponds to a user's control and therefore moves forward/backward, moves up/down, or makes the runner hub 105D rotate. For example, the electronic apparatus 400, in practice, can be an optical mouse, and the roller element 105 can be a user-controllable roller on the optical mouse. The first end 105A of the roller element 105 is located inside the optical mouse, and the second end 105B of the roller corresponds to a user's control. A user can press the second end 105B of the roller element 105 to make the second end 105B move up/down, or can rotate the roller element 105 to make the runner hub 105D rotate. The optical navigation circuit 110 is used for detecting at least one displacement of a surface image on a wheel face of the runner hub 105D to determine displacement of the surface image in a direction of at least one specific axis of the roller element 105. For example, the wheel face may be at least one of a circumferential end surface of the runner hub 105D and a wheel face in the direction of a radius of the runner hub 105D. That is to say, concerning the circumferential end surface, the optical navigation circuit 110 can detect, for example, the dotted-line area 105F to measure displacement of the surface image on the circumferential end surface, so as to determine a change of a rotation amount or a change of rotation angle caused by the user's specific operating behavior, such as a rotation amount and a rotation direction of the roller rotated by a user. In addition, concerning a wheel face in the direction of the radius, the optical navigation circuit 110 can detect, for example, the dotted-line area 105E to measure displacement of the surface image on the wheel face in the direction of the radius, so as to determine a change of a rotation amount or a change of a rotation angle caused by the user's specific operating behavior. In addition, the optical navigation circuit 110 can also determine a change of an upward/downward movement amount and a movement direction of the roller element 105 caused by the user's specific operating behavior.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic apparatus comprising:
a structure, having a first end located inside the electronic apparatus, and a second end protruding out of the electronic apparatus and arranged to be controlled by a user, wherein the structure is configured to move forward/backward in a specific direction and rotate around a specific axis, and there is no artifact for generating encoding patterns on the surface of the structure;
an optical navigation circuit, configured to use an optical sensor to directly capture reflection of a light emitting to the structure, to simultaneously detect a rotation displacement of a surface image of the structure around the specific axis and a forward/backward displacement of the surface image along the specific direction of the structure, and determine an operation of the user as performing specific behavior according to the detected at least one of the rotation displacement and the forward/backward displacement; and
a flexible structure, connected to the first end of the structure, wherein the user presses or releases the flexible structure via the second end of the structure;
wherein the optical navigation circuit is configured to sequentially detect first displacement and second displacement of the structure along a central axis, and determine whether the user presses or releases the flexible structure via the second end of the structure according to whether the first displacement and the second displacement sequentially satisfy a specific displacement condition.

2. The electronic apparatus of claim 1, wherein when the first displacement and the second displacement sequentially correspond to two displacement amounts in two opposite directions along the central axis, the optical navigation circuit determines that the user presses and then releases the flexible structure via the second end of the structure.

3. The electronic apparatus of claim 2, wherein when each of displacement amounts of the first displacement and the second displacement is smaller than a specific displacement amount, the optical navigation circuit does not refer to the first displacement and the second displacement to determine whether the user presses or releases the flexible structure.

4. The electronic apparatus of claim 2, wherein when the first displacement and the second displacement sequentially correspond to two displacement amounts in two opposite directions along the central axis, the optical navigation circuit determines that the user presses and then releases the flexible structure, and temporarily stops referring to displacement of the structure to determine an operation of the control of the user during a subsequent time interval.

5. The electronic apparatus of claim 1, wherein when the first displacement and the second displacement sequentially correspond to two displacement amounts in a same direction along the central axis, the optical navigation circuit determines that the user presses the flexible structure via the second end of the structure.

6. The electronic apparatus of claim 1, wherein the flexible structure is one of a flexible button, a spring, and a metal dome.

7. The electronic apparatus of claim 1, wherein the structure is one of a column object, a needle object, and a rod object.

8. The electronic apparatus of claim 1, wherein the user rotates the structure along a central axis of the structure via the second end of the structure; and the optical navigation circuit is configured to detect at least one third displacement of the surface image along a transverse axis of the structure, and determine that the user rotates the structure via the second end of the structure according to the at least one third displacement.

9. The electronic apparatus of claim 8, wherein according to the at least one third displacement, the optical navigation circuit determines a rotation amount and a rotation direction after the structure is rotated, and determines a corresponding angle and direction of the structure rotated by the user.

10. The electronic apparatus of claim 1, wherein the electronic apparatus is an optical mouse, and the structure is configured to realize at least one of a button function and a function of locking/unlocking a host screen.

11. The electronic apparatus of claim 1, wherein the electronic apparatus is a rotary combination lock device, and the structure is configured to realize a password rotary disc of the rotary combination lock device.

12. The electronic apparatus of claim 1, wherein the electronic apparatus is a wearable device, the second end of the structure is configured to realize at least one of a button and a rotary disc for the user to operate the wearable device.

13. The electronic apparatus of claim 1, wherein the structure is a roller element comprising a runner hub and a wheel shaft, the wheel shaft passes through the runner hub, and the roller element moves upward/downward or makes the runner hub rotate in response to the control of the user; and the optical navigation circuit is configured to detect at least one displacement of the surface image on a wheel face of the runner hub to determine displacement of the surface image in the direction of at least one specific axis of the structure.

14. The electronic apparatus of claim 13, wherein the wheel face of the runner hub comprises at least one of a circumferential end surface of the runner hub and a wheel face in a direction of a radius of the runner hub.

* * * * *